(12) United States Patent
Dombrowski (10) Patent No.: US 10,843,617 B2
(45) Date of Patent: Nov. 24, 2020

(54) CARRIAGE FOR MOVING A WHEELED OBJECT

(71) Applicant: STRINGO AB, Nyland (SE)

(72) Inventor: Micha Dombrowski, Kramfors (SE)

(73) Assignee: Stringo AB, Nyland (SE)

( * ) Notice: Subject to any disclaimer, the term of this patent is extended or adjusted under 35 U.S.C. 154(b) by 0 days.

(21) Appl. No.: 16/348,197

(22) PCT Filed: Nov. 1, 2017

(86) PCT No.: PCT/SE2017/051078
§ 371 (c)(1),
(2) Date: May 8, 2019

(87) PCT Pub. No.: WO2018/088946
PCT Pub. Date: May 17, 2018

(65) Prior Publication Data
US 2019/0322205 A1    Oct. 24, 2019

(51) Int. Cl.
*B60P 3/12* (2006.01)
*B62B 3/06* (2006.01)
*B60P 3/06* (2006.01)
(Continued)

(52) U.S. Cl.
CPC ............ *B60P 3/125* (2013.01); *B62B 3/0612* (2013.01); *B60P 3/06* (2013.01); *B60P 3/127* (2013.01);
(Continued)

(58) Field of Classification Search
CPC . B60P 3/125; B60P 3/127; B62B 3/06; B62B 3/0612; B62B 2202/90
(Continued)

(56) References Cited

U.S. PATENT DOCUMENTS 2,414,383 A * 1/1947 Merriam ................ B66F 7/246
414/430
2,661,817 A * 12/1953 Mullins .................... B60T 3/00
188/32
(Continued)

FOREIGN PATENT DOCUMENTS

EP    0405230 A1 * 1/1991  ............... B66F 9/18
FR    3027890 A1 * 5/2016  ............... B26B 3/06
(Continued)

*Primary Examiner* — James Keenan
(74) *Attorney, Agent, or Firm* — Dilworth & Barrese, LLP (57) ABSTRACT

A steerable carriage for moving a wheeled object comprising at least one engagement device (3) configured to engage with and elevate a wheel (5) of the wheeled object off the ground such that the wheeled object can be moved upon displacement of the carriage by transmitting a propulsion force from the carriage to the wheeled object via the at least one engagement device, wherein the at least one engagement device comprises: —a support device (12), —an actuating device (13) movable with respect to the support device such as to cause the wheel to roll forward onto the support device and be held by the support device and the actuating device, wherein the support device comprises: —a stopping member (18) movable between a folded position and a stopping position in which it is configured to stop forward motion of the wheel, and —an activation member (23) configured to cause the stopping member to move from the folded position to the stopping position when the wheel is rolled onto the support device.

10 Claims, 6 Drawing Sheets

(51) Int. Cl.
*B62B 3/04* (2006.01)
*B66F 7/24* (2006.01)
*B66F 7/28* (2006.01)

(52) U.S. Cl.
CPC ............ *B62B 3/04* (2013.01); *B62B 2202/90* (2013.01); *B66F 7/246* (2013.01); *B66F 7/28* (2013.01)

(58) Field of Classification Search
USPC ................................ 414/426, 429, 430, 563
See application file for complete search history.

(56) References Cited

U.S. PATENT DOCUMENTS

| | | | | |
|---|---|---|---|---|
| 4,036,384 A | * | 7/1977 | Johnson | B64F 1/227 |
| | | | | 414/430 |
| 4,350,470 A | * | 9/1982 | Murillo | B60B 29/002 |
| | | | | 280/79.11 |
| 4,655,670 A | | 4/1987 | Högberg et al. | |
| 4,793,763 A | * | 12/1988 | Bubik | B60P 3/125 |
| | | | | 280/402 |
| 4,859,134 A | * | 8/1989 | Lock | B60P 3/125 |
| | | | | 414/563 |
| 4,871,291 A | * | 10/1989 | Moore | B60P 3/125 |
| | | | | 414/563 |
| 4,904,146 A | * | 2/1990 | Lock | B60P 3/125 |
| | | | | 280/402 |
| 4,993,909 A | * | 2/1991 | Hamman | B60P 3/125 |
| | | | | 188/32 |
| 5,346,354 A | * | 9/1994 | Hellstrom | B60P 3/035 |
| | | | | 414/430 |
| 5,518,260 A | * | 5/1996 | Grignon | B60P 3/125 |
| | | | | 280/402 |
| 5,540,540 A | * | 7/1996 | Peterson | B60P 3/127 |
| | | | | 280/402 |
| 2008/0101903 A1 | | 5/2008 | Waner et al. | |
| 2013/0266415 A1 | | 10/2013 | Czartoryski et al. | |
| 2014/0299826 A1 | | 10/2014 | March et al. | |

FOREIGN PATENT DOCUMENTS

| | | |
|---|---|---|
| GB | 2354744 A | 4/2001 |
| WO | 89/11983 A1 | 12/1989 |

* cited by examiner

CARRIAGE FOR MOVING A WHEELED OBJECT

TECHNICAL FIELD OF THE INVENTION

The present invention relates to a steerable carriage for moving a wheeled object according to the preamble of claim 1. The wheeled object is primarily intended to be a vehicle, such as a passenger car or another motor vehicle.

BACKGROUND AND PRIOR ART

WO8911983 discloses a steerable carriage for transferring a wheeled object such as a passenger car. The carriage is particularly intended for moving motor vehicles indoors, such as on car sale premises, in factories, or similar. The carriage for this purpose comprises at least one engagement device that can be inserted under a front part of the chassis of the vehicle. The engagement device can thereafter engage with and elevate at least one wheel of the vehicle off the ground. When the carriage is moved, a propulsion force can be transferred from the carriage to the vehicle via the engagement device.

The engagement device has a support device with an upper support surface for supporting the wheel. The support surface slopes upward from the ground, such that the wheel can be easily rolled onto the support surface. Behind the support device, an actuating device is provided, which is movable with respect to the support device such as to cause the wheel to roll forward onto the support device and be held by the support device and the actuating device. When the wheel is elevated off ground, it is prevented from rolling backward off the engagement device by the actuating device. It is further prevented from rolling forward by means of an upwardly projecting part located in front of the support surface.

For passenger cars, there is a trend toward increased wheel diameter. However, the stability of a car during transfer using a carriage such as described above, in particular as the carriage is accelerated, decreases with increased wheel diameter. This increases the risk that the car rolls off the carriage during transfer, and it is therefore crucial that the carriage is provided with a means that prevents the vehicle from rolling off the carriage, such as the projecting part described above. However, modern passenger cars are often made with low chassis in order to improve driving characteristics and reduce air resistance. The part of the carriage that is moved in under the front part of the chassis must therefore be made low, which reduces the possibilities to include parts projecting from the engagement device.

SUMMARY OF THE INVENTION

It is a primary objective of the present invention to achieve a steerable carriage for moving a wheeled object which overcomes the above mentioned problem and which is in at least some aspect improved with respect to previously known carriages. In particular, it is an objective to achieve such a carriage which can be used to move vehicles with low chassis without risking that the vehicle rolls off the carriage.

At least the primary objective is achieved by means of the initially defined steerable carriage, which is characterised in that the support device comprises:

- a stopping member movable between a folded position and a stopping position in which it is configured to stop forward motion of the wheel, and
- an activation member located between the stopping member and the actuating device, which activation member is configured to cause the stopping member to move from the folded position to the stopping position when the wheel is rolled onto the support device.

When the engagement device is rolled in under the wheeled object, the stopping member is in its folded position. The total height of the engagement device as it is being rolled under the wheeled object is thereby kept relatively low, which facilitates entry of the engagement device under wheeled objects, such as passenger cars, having low chassis. As the actuating device initiates rolling of the wheel forward onto the support device, the stopping member is moved into its stopping position. Further forward motion of the wheel, such that the wheel rolls off the support device, is thereby prevented. The carriage in this way combines a low height allowing it to be rolled in under the chassis of the wheeled object with means preventing the wheel from rolling off the carriage during transfer. The engagement device is primarily intended for engagement with a steerable wheel of the wheeled object, such as a front wheel of a passenger car. Other wheels of the wheeled object, e.g. the rear wheels of a passenger car, can remain on the ground and are thereby free to roll during transfer.

The stopping member is movable with respect to the activation member and other parts of the support device. Thus, in the folded position, the stopping member is in a different position relative to the activation member than in the stopping position.

According to one embodiment, in the folded position, the stopping member is positioned below a level of an upper surface of the chassis, and, in the stopping position, the stopping member projects above the upper surface. The stopping member is thereby protected as the engagement device is rolled in under the wheeled object. The upper surface of the chassis is herein to be understood as the upper surface of the chassis at a rear portion of the carriage, configured to be moved in under the wheeled object.

According to one embodiment, the stopping member is configured to make contact with a fixed frame member of the chassis in the stopping position, thereby preventing further movement of the stopping member. The stopping member is thereby efficiently stopped in the stopping position.

According to one embodiment, the activation member and the stopping member are mechanically linked so as to transfer a force applied by the wheel on the activation member to the stopping member. Mechanical linking is a robust way to achieve that the force applied to the activation member is transferred to the stopping member, moving it into its stopping position.

According to one embodiment, the stopping member is pivotably supported on the chassis and the support device comprises at least one lever which is pivotably supported on the chassis between the activation member and the stopping member, and which is adapted to transfer the force applied on the activation member to the stopping member. Sufficient height in the stopping position can thereby easily be achieved.

According to one embodiment, the stopping member comprises a stopping bar configured to make contact with the wheel, said stopping bar extending in parallel with or essentially in parallel with an axis of rotation of the wheel, and at least one pivot arm supporting the stopping bar, said pivot arm being pivotably supported on the chassis in front of the stopping bar. The stopping bar efficiently stops movement when in the stopping position and the pivot arm allows the stopping member to be easily moved between the folded position and the stopping position. By essentially in parallel is herein intended ±10°. Preferably, the stopping member comprises two pivot arms, one on each side of the stopping bar, to provide increased stability. The pivot arms may also be connected by e.g. a piece of sheet metal for increased stability and for force transfer from the lever.

According to one embodiment, the stopping member is movable between the folded position and the stopping position via an intermediate position assumed just before the wheel is elevated off ground, wherein the stopping member is configured such that, in the intermediate position, an intersection between on one hand an imaginary plane extending in parallel with the axis of rotation of the wheel along the pivot arm, and on the other hand a vertical plane through a centre of the wheel and parallel to the axis of rotation of the wheel, is located above the axis of rotation of the wheel. The length of the pivot arm is adjusted to achieve this effect. This prevents the stopping member from being pressed by the wheel into the folded position as the weight of the wheel is transferred onto the support device.

According to one embodiment, the stopping member comprises an adjustment member, by means of which an inclination of the pivot arm in the stopping position can be adjusted. The adjustment member may comprise a plate configured to make contact with a frame member of the chassis in the stopping position, wherein the angle between the plate and the pivot arm as seen in a side view can be varied by fixing the adjustment member to the pivot arm in one of at least two predetermined positions. The adjustment member allows adjustment of the engagement device to accommodate different wheel sizes.

According to one embodiment, the activation member comprises an activation bar extending in parallel with or essentially in parallel with an axis of rotation of the wheel. The activation bar can preferably be rotationally journalled in order to facilitate rolling of the wheel onto the support device. By essentially in parallel is herein intended ±10°.

According to one embodiment, the support device on each side of the activation bar further comprises at least one support bar extending in parallel with or essentially in parallel with the activation bar, wherein the support bars are configured to support the wheel and together define an inclined plane sloping upwardly in the forward direction. The inclined plane formed by the support bars facilitates rolling the wheel on and off the support device and reduces the power consumption needed to roll the wheel onto the support device. By using support bars, a more stable support can be achieved than by using a planar inclined surface, since two points of contact can be provided. Not all support bars need to carry weight when the wheel is held by the support device and the actuating device. By essentially in parallel is herein intended ±10°.

According to one embodiment, the support bars are rotationally journalled in the chassis. Rolling onto the support device is thereby facilitated.

According to one embodiment, the carriage comprises two engagement devices for simultaneous engagement with two wheels of a vehicle. This is useful for transfer of e.g. passenger cars.

Other advantageous features as well as advantages of the present invention will appear from the following description.

BRIEF DESCRIPTION OF THE DRAWINGS

The invention will in the following be further described by means of example with reference to the appended drawings, wherein.

DETAILED DESCRIPTION OF EMBODIMENTS OF THE INVENTION

Figure 1:
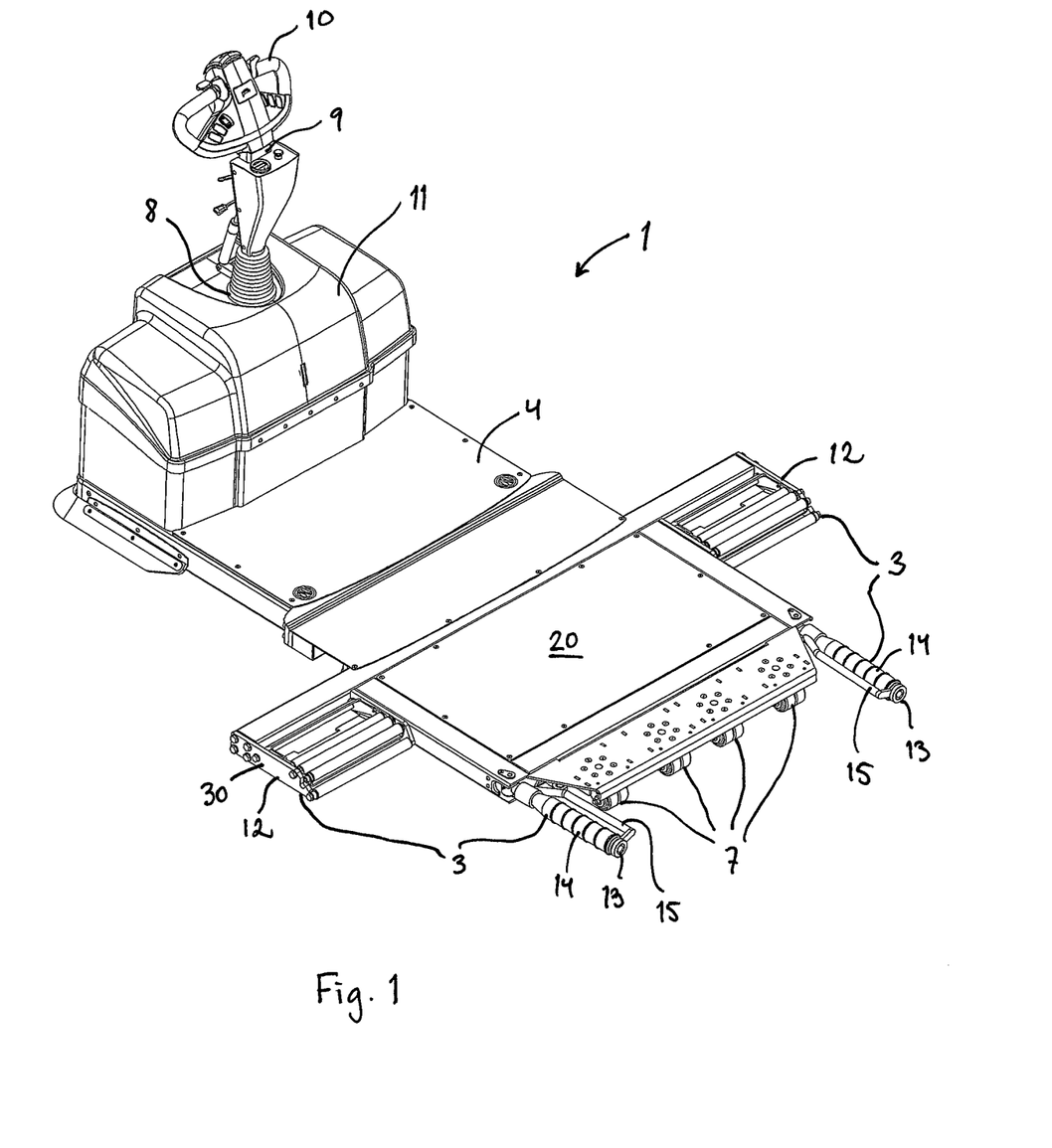
FIG. 1 is a perspective view showing a carriage according to an embodiment of the invention.
Figure 2:
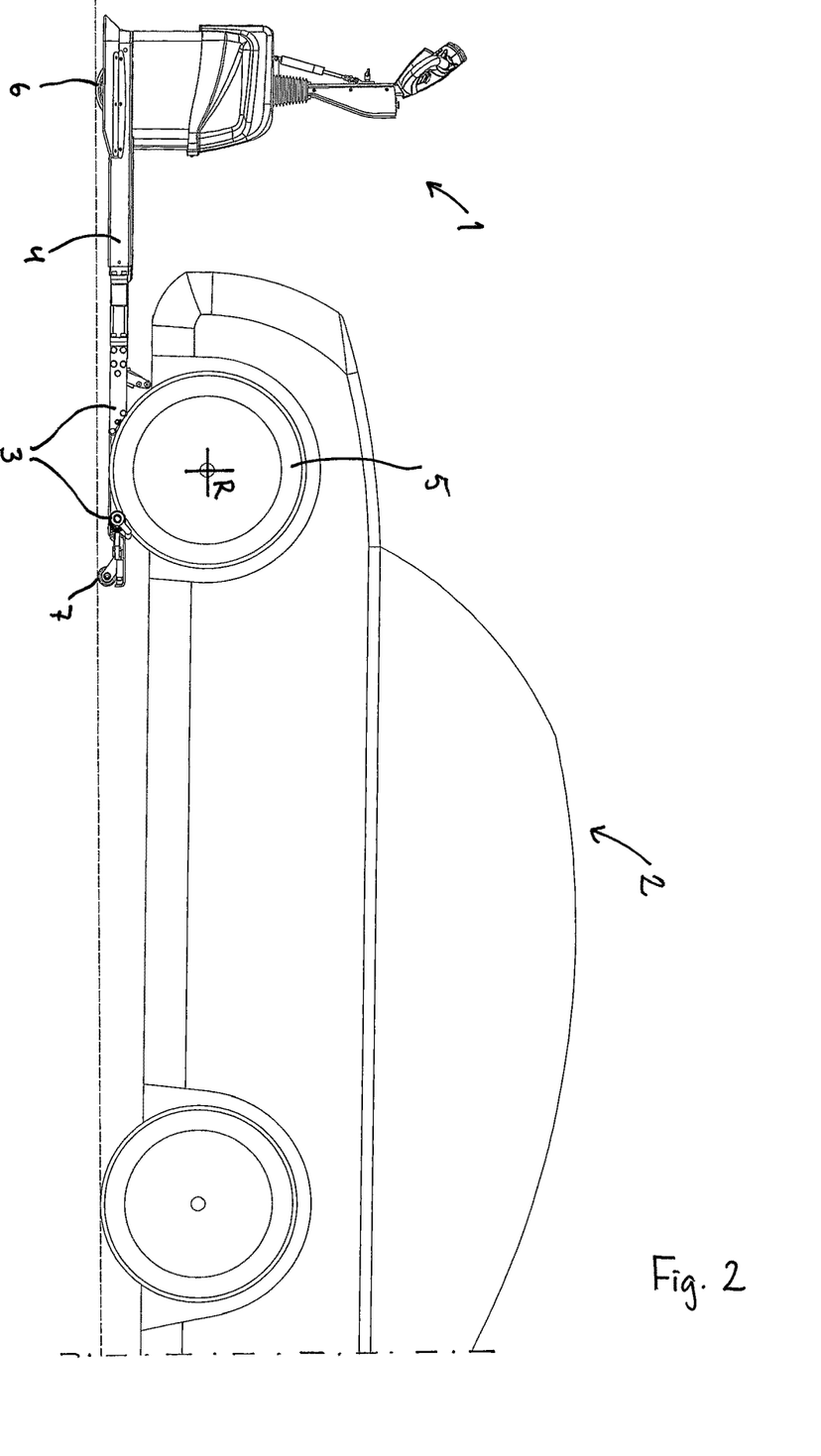
FIG. 2 is a side view showing the carriage in FIG. 1 holding a passenger car.

A carriage 1 according to an embodiment of the invention is schematically shown in FIG. 1. FIG. 2 shows the carriage 1 together with a vehicle 2 in the form of a passenger car.

The shown carriage 1 is primarily intended for moving of vehicles having two front wheels, such as a passenger car. The carriage 1 has for this purpose two engagement devices, generally denoted as 3, provided on a chassis 4 of the carriage 1. Each engagement device 3 is configured to engage with and elevate a front wheel 5 of the vehicle 2 off the ground such as schematically shown in FIG. 2. When the wheels 5 are held in an elevated position, the vehicle 2 can be moved upon displacement of the carriage by transmitting a propulsion force from the carriage 1 to the vehicle 2 via the engagement devices 3. The carriage 1 is configured to contact the ground via a steerable wheel 6 at a forward portion of the carriage 1 and several support wheels 7 at a rear portion of the carriage 1. The steerable wheel 6 is connected to a carrier 8 which is pivotable with respect to the chassis 4 about a vertical axis. A steering lever 9 with a handle 10 is connected to the carrier 8. An operator walking on the ground may hold the handle 10 and by means of the steering lever 9 rotate the carrier 8 and accordingly the steerable wheel 6 so that the direction of movement of the carriage 1 may be changed. Furthermore, it is preferred that the steerable wheel 6 is driven by a motor located below a hub 11 of the carriage 1, suitably an electrical motor, so that the operator need not produce any movement or transfer forces but only has to steer the carriage 1 in the desired direction.

Each engagement device 3 comprises a support device 12 and an actuating device 13, both mounted on the chassis 4. The actuating device 13 is movable with respect to the support device 12 by means of a power member (not shown) such as to cause the wheel 5 of the vehicle 2 to roll forward onto the support device 12 and be held by the support device 12 and the actuating device 13. The actuating device 13 is pivotably mounted on the chassis 4 and comprises an axle on which a roller 14 is rotatably mounted, such that the roller 14 is freely rotatable around a longitudinal axis of the axle. In the shown embodiment, the actuating device 13 further comprises a projecting locking member 15, which is mounted on the axle and which is rotatable around the longitudinal axis of the axle by means of the power member. This can be achieved either by providing a rotatable axle, or by providing means for rotating the locking member 15 about the axle. The actuating device 13 is thereby on one hand pivotable in a horizontal plane by means of the power member, and on the other hand rotatable about its own longitudinal axis, also by means of the power member. The power member may preferably be connected to the motor of the carriage 1.

Figure 3A:
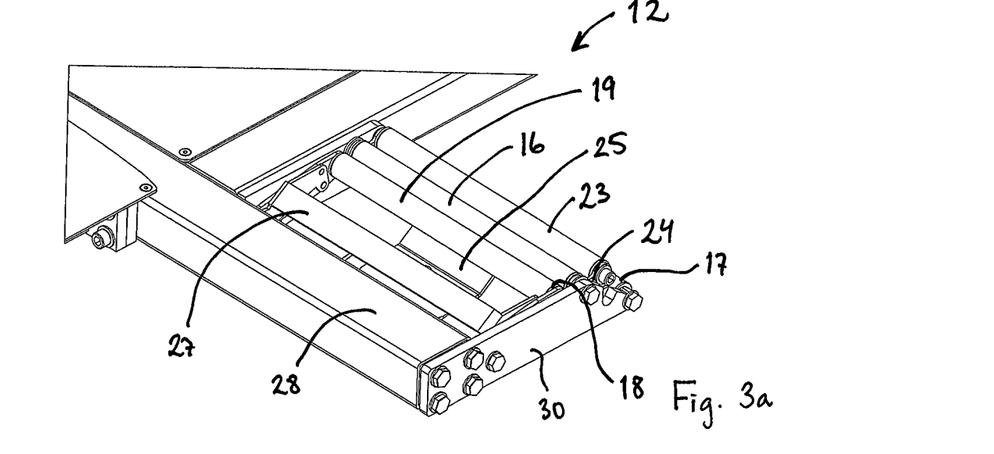
FIG. 3a-c show parts of the carriage from FIG. 1 in a folded position.
Figure 3B:
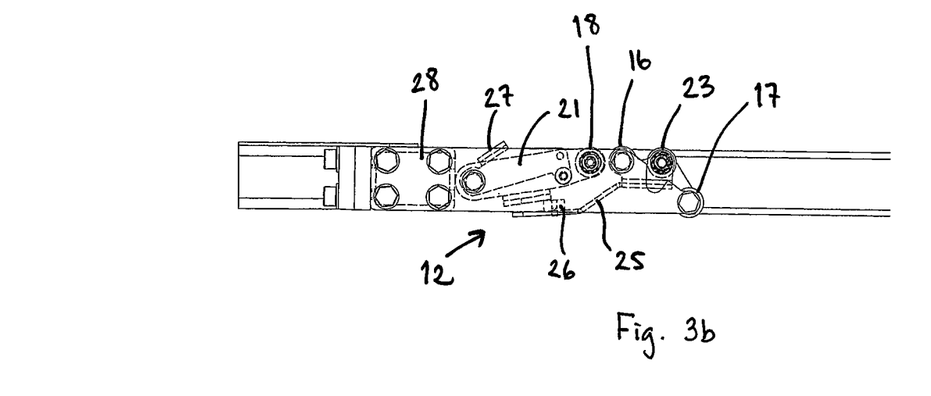
Figure 3C:
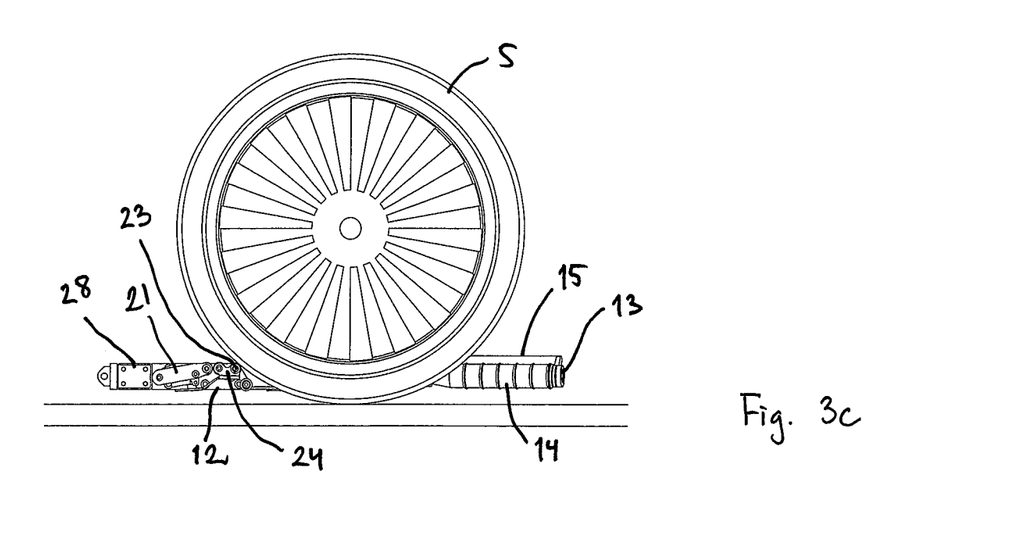
Figure 4A:
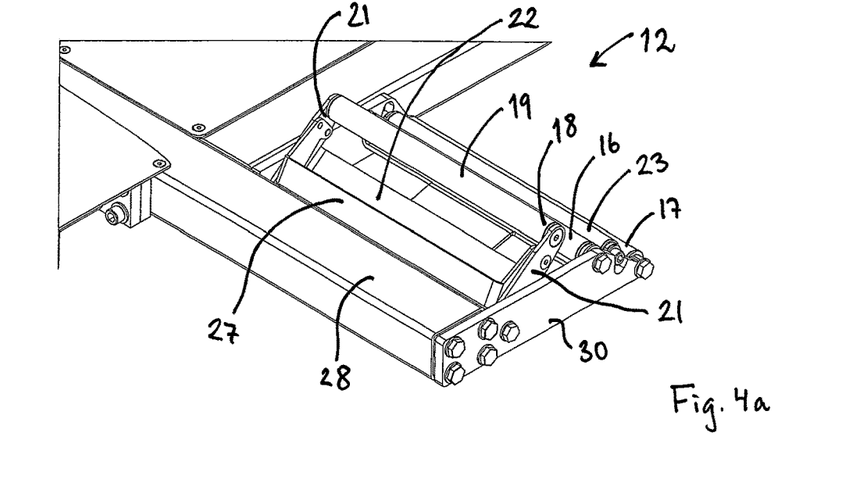
FIG. 4a-c show parts of the carriage from FIG. 1 in an intermediate position.
Figure 4B:
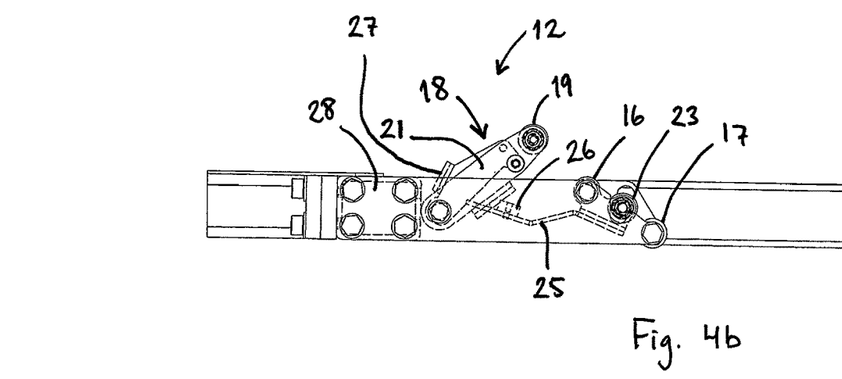
Figure 4C:
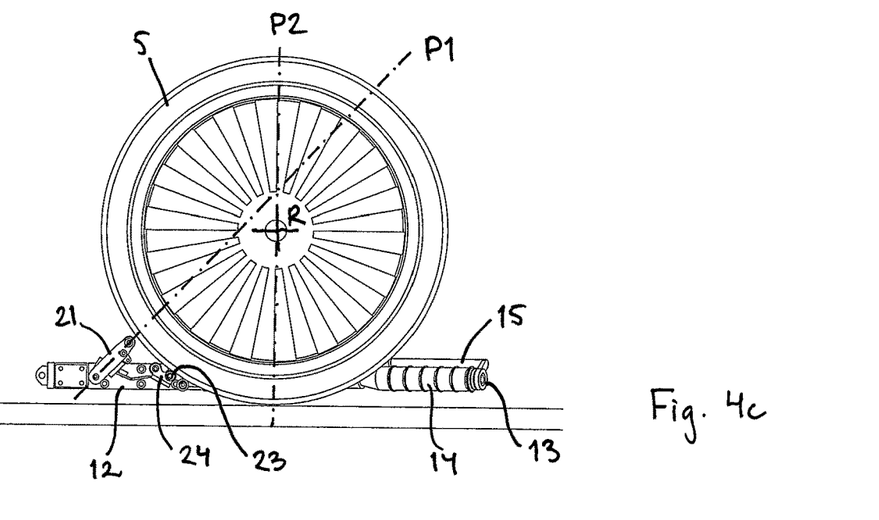
Figure 5A:
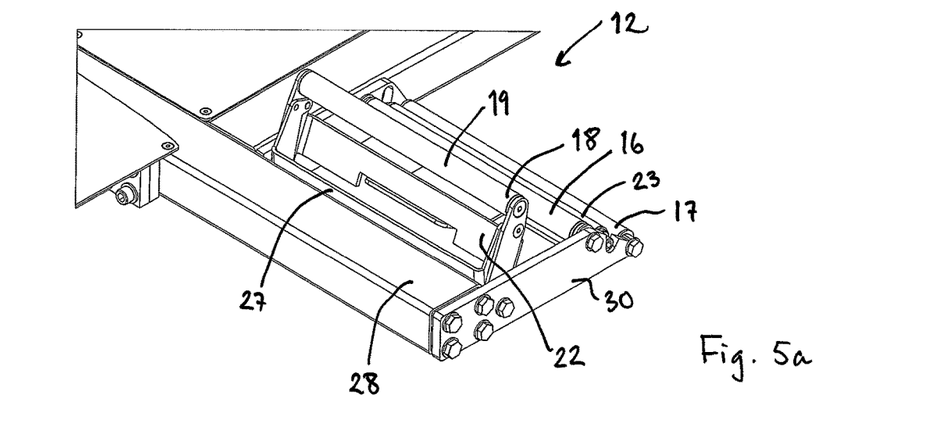
FIG. 5a-c show parts of the carriage from FIG. 1 in a stopping position.
Figure 5B:
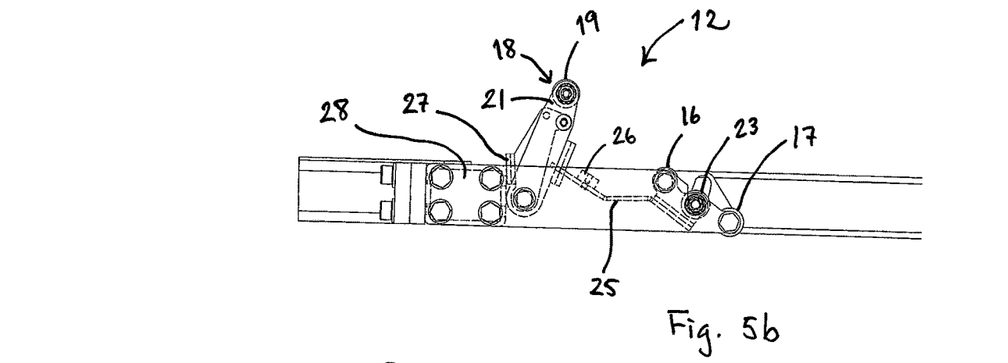
Figure 5C:
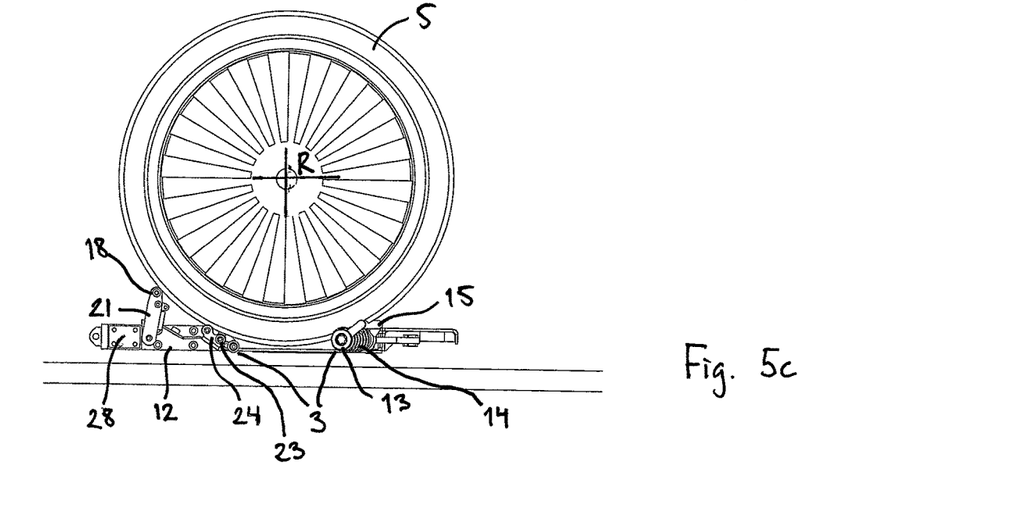

FIGS. 3a, 4a, and 5a and FIGS. 3b, 4b and 5b show the support device 12 in perspective views and side views, respectively, in different positions. FIGS. 3c, 4c and 5c show the engagement device 3 in side views together with a wheel 5 of a vehicle. In the latter views, a protective side plate 30 has been removed so that details of the support device 12 can be seen. The engagement device 3 is shown in a folded position (FIG. 3a-c), an intermediate position (FIG. 4a-c) and a stopping position (FIG. 5a-c), respectively.

In the folded position, the actuating device 13 extends in a direction transverse to an axis of rotation R of the wheel 5, as can be seen in FIG. 3c and such as also shown in FIG. 1. The wheel 5 rests on the ground. In this position, the rear portion of the carriage 1, on which the engagement device 3 is provided, can be rolled in under a front portion of a passenger car such that the support devices 12 approach the wheels 5 of the passenger car.

In the intermediate position, the actuating device 13 has been pivoted forward in the horizontal plane by means of the power member so as to engage with the wheel 5 and push it forward toward the support device 12 such as shown in FIG. 4c.

In the stopping position, the actuating device 13 extends in a direction parallel to the axis of rotation R of the wheel 5 and the wheel 5 is held by the actuating device 13 and the support device 12 such as shown in FIG. 4c and in FIG. 2. The locking member 15 of the actuating device 13 has in the stopping position been rotated by means of the power member so that it projects upward/backward and prevents the wheel 5 from rolling backward off the carriage.

The support device 12 comprises a forward, uppermost support bar 16 and a rear, lowermost support bar 17 which are freely rotatable around their longitudinal axes and which extend in parallel to the axis of rotation R of the wheel 5. The support bars 16, 17 together define an inclined plane that slopes upward in the forward direction so that the wheel 5 can easily be rolled onto the support device 12.

The support device 12 also comprises a stopping member 18 which is movable between the folded position and the stopping position. In the stopping position, a stopping bar 19 is configured to make contact with the wheel 5 and thereby stop forward motion of the latter. In the folded position, the stopping member 18 is entirely positioned below a level of an upper surface 20 of the chassis 4 at the rear portion of the carriage 1, configured to be moved in under the vehicle 2. The stopping bar 19 is held by two pivot arms 21 in the form of brackets pivotably supported on the chassis 4 in front of the stopping bar. One of the pivot arms is supported on the protective plate 30 of the chassis 4. The stopping member 18 is thereby pivotable about a pivot axis parallel to the axis of rotation of the wheel 5. Between the pivot arms 21, a piece of sheet metal 22 extends.

The support device 12 further comprises an activation member 23 comprising an activation bar located between the stopping member 18 and the actuating device 13 and between the support bars 16, 17. The activation member 23 is pivotably supported on the chassis 4 by means of brackets 24 such that it is pivotable about an axis that coincides with the longitudinal axis of the forward, uppermost support bar 16, i.e. in front of the activation member 23 itself. The activation member 23 is configured to cause the stopping member 18 to move from the folded position to the stopping position when the wheel 5 is rolled onto the support device 12. For this purpose, the activation member 23 and the stopping member 18 are mechanically linked by means of a lever 25. The lever 25 is formed from bent and cut sheet metal which is configured to be pivotable together with the activation member 23 about the same axis. A spacer 26 is provided on the lever 25, which spacer 26 is in contact with the piece of sheet metal 22 of the stopping member 18 when the stopping member 18 is in the folded position.

When the wheel 5 is rolled onto the activation member, the lever 25 is pivoted about the longitudinal axis of the forward, uppermost support bar 16. It thereby contacts the piece of sheet metal 22 of the stopping member 18 and actuates an upward/forward motion of the stopping bar 19. The force applied by the wheel 5 on the activation member 23 is thereby transferred to the stopping member 18 and the stopping member 18 is moved from the folded position via the intermediate position and into the stopping position.

The stopping member 18 has a stopping plate 27 configured to make contact with a vertical portion of a fixed frame member 28 of the chassis 4 in the stopping position, thereby preventing further movement of the stopping member 18.

The intermediate position is assumed just before the wheel 5 is elevated off ground. The actuating device 13 is in contact with the wheel 5 and is just about to roll it off the ground and onto the activation member 23. If an imaginary plane P1 is defined extending in parallel with the axis of rotation of the wheel R and along the pivot arms 21 of the stopping member 18, and a vertical plane P2 is defined through a centre of the wheel 5 and parallel to the axis of rotation R of the wheel 5, an intersection between these planes P1, P2 is located above the axis of rotation R of the wheel 5 as shown in FIG. 4c.

Figure 6A:
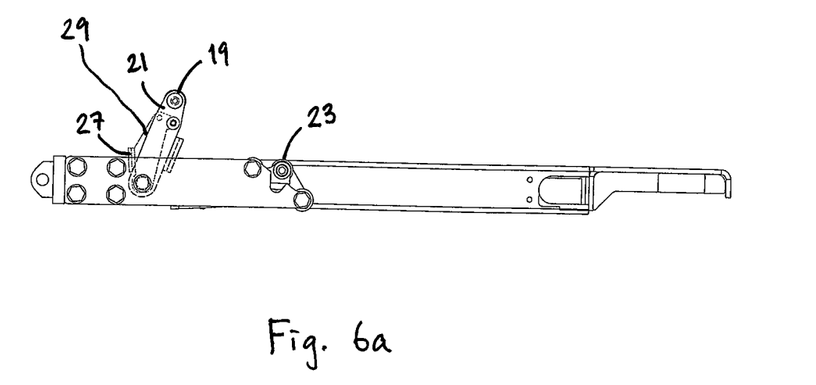
FIG. 6a-b show parts of the carriage from FIG. 1 in two different stopping positions.
Figure 6B:
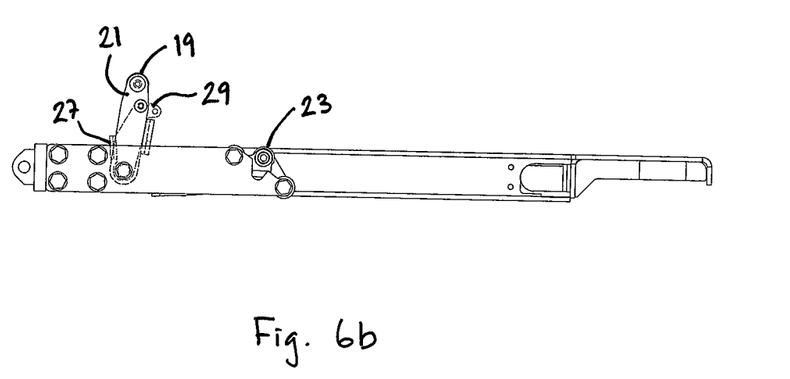

The support device 12 is adjustable such that two different stopping positions can be achieved, adapted for different diameters of the wheel 5 as shown in FIGS. 6a-b. FIG. 6a shows the support device 12 adapted for smaller wheel diameters and FIG. 6b shows the support device 12 adapted for larger wheel diameters. The different stopping positions are achievable by means of an adjustment member 29 which is attached to the pivot arms 21 of the stopping member 18 in one of two available positions. The stopping plate 27 is herein provided on the adjustment member 29. By moving the adjustment member 29 between the two available positions, the angle of the imaginary plane P1 in the stopping position is altered. In other words, the inclination of the pivot arm 21 in the stopping position can be adjusted. The angle between the stopping plate 27 and the pivot arm 21 as seen in a side view can be varied by fixing the adjustment member 29 to the pivot arm 21 in one of at least two predetermined positions. The adjustment member 29 allows adjustment of the engagement device 3 to accommodate different wheel sizes.

The invention is of course not in any way restricted to the embodiments described above, but many possibilities to modifications thereof would be apparent to a person with skill in the art without departing from the scope of the invention as defined in the appended claims.

The invention claimed is:

1. A steerable carriage (1) for moving a wheeled object (2), comprising at least one engagement device (3) configured to engage with and elevate a wheel (5) of the wheeled object (2) off the ground such that the wheeled object (2) can be moved upon displacement of the carriage (1) by transmitting a propulsion force from the carriage (1) to the wheeled object (2) via the at least one engagement device (3), wherein the at least one engagement device (3) is provided on a chassis (4) of the carriage (1) and comprises:
a support device (12),
an actuating device (13) which is movable with respect to the support device (12) to cause the wheel (5) to roll forward onto the support device (12) and be held by the support device (12) and the actuating device (13), and
the support device (12) comprises:
a stopping member (18) movable between a folded position and a stopping position in which it is configured to stop forward motion of the wheel (5),
an activation member (23) located between the stopping member (18) and the actuating device (13), which activation member (23) is configured to cause the stopping member (18) to move from the folded position to the stopping position when the wheel (5) is rolled onto the support device (12),
the activation member (23) and the stopping member (18) are mechanically linked to transfer a force applied by the wheel (5) on the activation member (23) to the stopping member (18),
the stopping member (18) is pivotably supported on the chassis (4), and
the support device (12) comprises at least one lever (25) which is pivotably supported on the chassis (4) between the activation member (23) and the stopping member (18) to pivot together with the activation member (23) about a common pivot axis, and which is adapted to transfer force applied on the activation member (23) to the stopping member (18).

2. The carriage according to claim 1, wherein, in the folded position, the stopping member (18) is positioned below a level of an upper surface (20) of the chassis (4), and, in the stopping position, the stopping member (18) projects above the upper surface (20).

3. The carriage according to claim 1, wherein the stopping member (18) is configured to make contact with a fixed frame member (28) of the chassis (4) in the stopping position, thereby preventing further movement of the stopping member (18).

4. The carriage according to claim 1, wherein the stopping member (18) comprises a stopping bar (19) configured to make contact with the wheel (5), said stopping bar (19) extending in parallel with or essentially in parallel with an axis of rotation (R) of the wheel (5), and at least one pivot arm (21) supporting the stopping bar (19), said pivot arm (21) being pivotably supported on the chassis (4) in front of the stopping bar (19).

5. The carriage according to claim 4, wherein the stopping member (18) comprises an adjustment member (29), by which an inclination of the pivot arm (21) in the stopping position can be adjusted.

6. The carriage according to claim 1, wherein the activation member (23) comprises an activation bar extending in parallel with or essentially in parallel with an axis of rotation (R) of the wheel (5).

7. A carriage according to claim 1, wherein the carriage (1) comprises two engagement devices (3) for simultaneous engagement with two wheels (5) of a vehicle.

8. A steerable carriage (1) for moving a wheeled object (2), comprising at least one engagement device (3) configured to engage with and elevate a wheel (5) of the wheeled object (2) off the ground such that the wheeled object (2) can be moved upon displacement of the carriage (1) by transmitting a propulsion force from the carriage (1) to the wheeled object (2) via the at least one engagement device (3), wherein
the at least one engagement device (3) is provided on a chassis (4) of the carriage (1) and comprises:
a support device (12),
an actuating device (13) which is movable with respect to the support device (12) to cause the wheel (5) to roll forward onto the support device (12) and be held by the support device (12) and the actuating device (13),
the support device (12) comprises:
a stopping member (18) movable between a folded position and a stopping position in which it is configured to stop forward motion of the wheel (5), and
an activation member (23) located between the stopping member (18) and the actuating device (13), which activation member (23) is configured to cause the stopping member (18) to move from the folded position to the stopping position when the wheel (5) is rolled onto the support device (12),
the stopping member (18) is pivotably supported on the chassis (4),
the support device (12) comprises at least one lever (25) which is pivotably supported on the chassis (4) between the activation member (23) and the stopping member (18), and which is adapted to transfer force applied on the activation member (23) to the stopping member (18),
the stopping member (18) comprises a stopping bar (19) configured to make contact with the wheel (5), said stopping bar (19) extending in parallel with or essentially in parallel with an axis of rotation (R) of the wheel (5), and at least one pivot arm (21) supporting the stopping bar (19), said pivot arm (21) being pivotably supported on the chassis (4) in front of the stopping bar (19), and
the stopping member (18) is movable between the folded position and the stopping position via an intermediate position assumed just before the wheel (5) is elevated off ground, and the stopping member (18) is configured such that, in the intermediate position, an intersection between on one hand an imaginary plane (P1) extending in parallel with the axis of rotation of the wheel (5) along the pivot arm (21), and on the other hand a vertical plane (P2) through a centre of the wheel (5) and parallel to the axis of rotation (R) of the wheel (5), is located above the axis of rotation (R) of the wheel (5).

9. A steerable carriage (1) for moving a wheeled object (2), comprising at least one engagement device (3) configured to engage with and elevate a wheel (5) of the wheeled object (2) off the ground such that the wheeled object (2) can be moved upon displacement of the carriage (1) by transmitting a propulsion force from the carriage (1) to the wheeled object (2) via the at least one engagement device (3), wherein
the at least one engagement device (3) is provided on a chassis (4) of the carriage (1) and comprises:
a support device (12),
an actuating device (13) which is movable with respect to the support device (12) to cause the wheel (5) to roll forward onto the support device (12) and be held by the support device (12) and the actuating device (13),
the support device (12) comprises:
a stopping member (18) movable between a folded position and a stopping position in which it is configured to stop forward motion of the wheel (5), and
an activation member (23) located between the stopping member (18) and the actuating device (13), which activation member (23) is configured to cause the stopping member (18) to move from the folded position to the stopping position when the wheel (5) is rolled onto the support device (12), the activation member (23) comprises an activation bar extending in parallel with or essentially in parallel with an axis of rotation (R) of the wheel (5), the support device (12) on each side of the activation bar further comprises at least one support bar (16, 17) extending in parallel with or essentially in parallel with the activation bar, and the support bars (16, 17) are configured to support the wheel (5) and together define an inclined plane sloping upwardly in the forward direction.

10. The carriage according to claim 9, wherein the support bars (16, 17) are rotationally journalled in the chassis (4).

* * * * *